(12) United States Patent
Thompson

(10) Patent No.: US 8,987,618 B2
(45) Date of Patent: Mar. 24, 2015

(54) NON-LOAD BREAK ISOLATING SWITCH, VOLTAGE CONTROLLERS, AND ASSEMBLY METHODS

(71) Applicant: Siemens Industry, Inc., Alpharetta, GA (US)

(72) Inventor: Truett Ramsey Thompson, Raleigh, NC (US)

(73) Assignee: Siemens Industry, Inc., Alpharetta, GA (US)

( * ) Notice: Subject to any disclaimer, the term of this patent is extended or adjusted under 35 U.S.C. 154(b) by 208 days.

(21) Appl. No.: 13/623,261

(22) Filed: Sep. 20, 2012

(65) Prior Publication Data

US 2013/0319831 A1   Dec. 5, 2013

Related U.S. Application Data

(60) Provisional application No. 61/655,837, filed on Jun. 5, 2012.

(51) Int. Cl.
*H01H 9/00* (2006.01)
*H02B 11/00* (2006.01)
*H01H 11/00* (2006.01)
*H02B 11/04* (2006.01)

(52) U.S. Cl.
CPC .............. *H01H 11/00* (2013.01); *H02B 11/04* (2013.01)

USPC ................. 200/50.27; 200/50.17; 200/50.03

(58) Field of Classification Search
CPC ....... H01H 11/00; H01H 33/16; H01H 33/32; H01H 33/34; H01H 33/38; H01H 33/596; H01H 33/6661; H01H 3/40; H01H 3/44; H01H 9/0027; H01H 9/542; H02B 11/04
USPC .......... 200/50.27, 50.03, 50.06, 50.21, 50.17
See application file for complete search history.

(56) References Cited

U.S. PATENT DOCUMENTS

| | | | | |
|---|---|---|---|---|
| 5,111,009 | A * | 5/1992 | Chan et al. | 200/330 |
| 5,837,950 | A * | 11/1998 | Horikawa | 200/50.21 |
| 6,265,678 | B1 * | 7/2001 | Robbins et al. | 200/50.21 |
| 6,518,526 | B2 * | 2/2003 | Hamada et al. | 200/330 |
| 7,034,233 | B2 * | 4/2006 | Deylitz et al. | 200/50.01 |

* cited by examiner

Primary Examiner — Kyung Lee

(57) ABSTRACT

A non-load break isolating switch for a voltage controller or other electrical component controller may include a mangle pinion gear shaft and a slider having a gear rack that meshes with the mangle pinion gear shaft. Movement of an ON/OFF switch handle of the controller may cause the mangle pinion gear shaft to rotate. Rotation of the mangle pinion gear shaft may cause the slider to linearly translate along a fixed path, where a conductive connector on the slider may engage or disengage a finger assembly to make or break a connection with a voltage bus. Voltage controllers and methods of assembling a non-load break isolating switch are also provided, as are other aspects.

17 Claims, 6 Drawing Sheets

NON-LOAD BREAK ISOLATING SWITCH, VOLTAGE CONTROLLERS, AND ASSEMBLY METHODS

CROSS REFERENCE TO RELATED APPLICATION

This claims the benefit of U.S. Provisional Patent Application No. 61/655,837, filed Jun. 5, 2012, which is hereby incorporated by reference herein in its entirety.

FIELD

The invention relates generally to voltage controllers and more particularly to non-load break isolating switches that may be used in voltage controllers.

BACKGROUND

Voltage controllers may be categorized as low, medium, or high voltage. Medium-voltage and high-voltage controllers generally have an enclosure that may include stacked upper and lower cells. Low-voltage controllers may have more than two stacked cells. The stacked cells may be electrically isolated from each other, and each cell may contain, e.g., a motor or other type of controller. A non-load break isolating switch may be used in each cell to make or break a connection between a voltage controller and a main voltage bus running through the voltage controller enclosure. Breaking the connection isolates the cell from the main voltage bus, allowing operators to open a door providing access to the enclosure thereby providing an opportunity to safely perform standard maintenance and other tasks related to the voltage controller. Multiple medium-voltage controller enclosures may be assembled next to each other to form a lineup of voltage controllers. Because of the hazards associated with the relatively high voltages used by medium-voltage controllers, a need exists to provide reliable non-load break isolating switches.

SUMMARY

According to a first aspect, an improved non-load break isolating switch is provided. The non-load break isolating switch comprises a finger assembly configured to electrically connect to a voltage bus, a slider comprising a gear rack and a conductive connector configured to electrically engage and disengage the finger assembly, a gear shaft comprising a longitudinal axis and a gear configured to mesh with the gear rack, and a housing within which the slider, gear shaft, and finger assembly are located, wherein rotation of the gear shaft about the longitudinal axis causes the slider to move linearly from a first position at which the conductive connector electrically engages the finger assembly to a second position at which the conductive connector is electrically disengaged from the finger assembly or move linearly from the second position to the first position.

According to another aspect, a voltage controller is provided. The voltage controller includes a non-load break isolating switch that includes a rack and pinion mechanism configured to electrically connect to and disconnect from a voltage bus, at least one fuse electrically connected to the non-load break isolating switch, one or more voltage terminals configured to be connected to an electric load, and a contactor electrically connected to the at least one fuse and to the one or more voltage terminals, the contactor operative to transfer power received from the voltage bus to the one or more voltage terminals.

According to a further aspect, a method of assembling an improved non-load break isolating switch is provided. The method includes providing a housing, providing a finger assembly configured to electrically connect to a voltage bus, attaching the finger assembly to the housing, providing a slider having a gear rack and a conductive connector configured to electrically engage and disengage the finger assembly, positioning the slider in the housing, providing a gear shaft having a longitudinal axis and a gear that meshes with the gear rack, and securing the gear shaft to the housing such that the gear shaft is operative to rotate about the longitudinal axis to cause the slider to linearly translate from a first position at which the conductive connector electrically engages the finger assembly to a second position at which the conductive connector is electrically disengaged from the finger assembly, or linearly translate from the second position to the first position.

According to a still further aspect, a method of using a non-load break isolating switch is provided. The method includes the following: connecting power to a non-load break isolating switch; moving a switch handle operatively connected to the non-load break isolating switch from an OFF position to an ON position to cause the non-load break isolating switch to close an electrical connection within the non-load break isolating switch to the power by causing a gear shaft to rotate in a first rotational direction, the gear shaft rotating in the first rotational direction causing a conductive connector to move in a first direction to electrically connect with the power; and moving the switch handle from the ON position to the OFF position to cause the non-load break isolating switch to open the electrical connection to the power by causing the gear shaft to rotate in a second rotational direction, the gear shaft rotating in the second rotational direction causing the conductive connector to move in a second direction to electrically disconnect from the power.

Still other aspects, features, and advantages of the invention may be readily apparent from the following detailed description wherein a number of exemplary embodiments and implementations are described and illustrated, including the best mode contemplated for carrying out the invention. The invention may also be capable of other and different embodiments, and its several details may be modified in various respects, all without departing from the scope of the invention. Accordingly, the drawings and descriptions are to be regarded as illustrative in nature, and not as restrictive. The drawings are not necessarily drawn to scale. The invention covers all modifications, equivalents, and alternatives falling within the scope of the invention.

DETAILED DESCRIPTION

Reference will now be made in detail to the example embodiments of this disclosure, which are illustrated in the accompanying drawings. Wherever possible, the same reference numbers will be used throughout the drawings to refer to the same or like parts.

The aforementioned problem of providing reliable non-load break isolating switches that may be used in medium-voltage controllers may be overcome by one or more embodiments of the invention. In one aspect, a non-load break isolating switch may incorporate a rack and pinion mechanism that converts rotational motion of a mangle pinion gear shaft to linear motion of a slider. The slider may have one or more conductive connectors for connecting to and disconnecting from a voltage bus accessible in a medium-voltage controller enclosure. In other aspects, methods of assembling a non-load break isolating switch are provided, as will be explained in greater detail below in connection with FIGS. 1-11.

Figure 1:
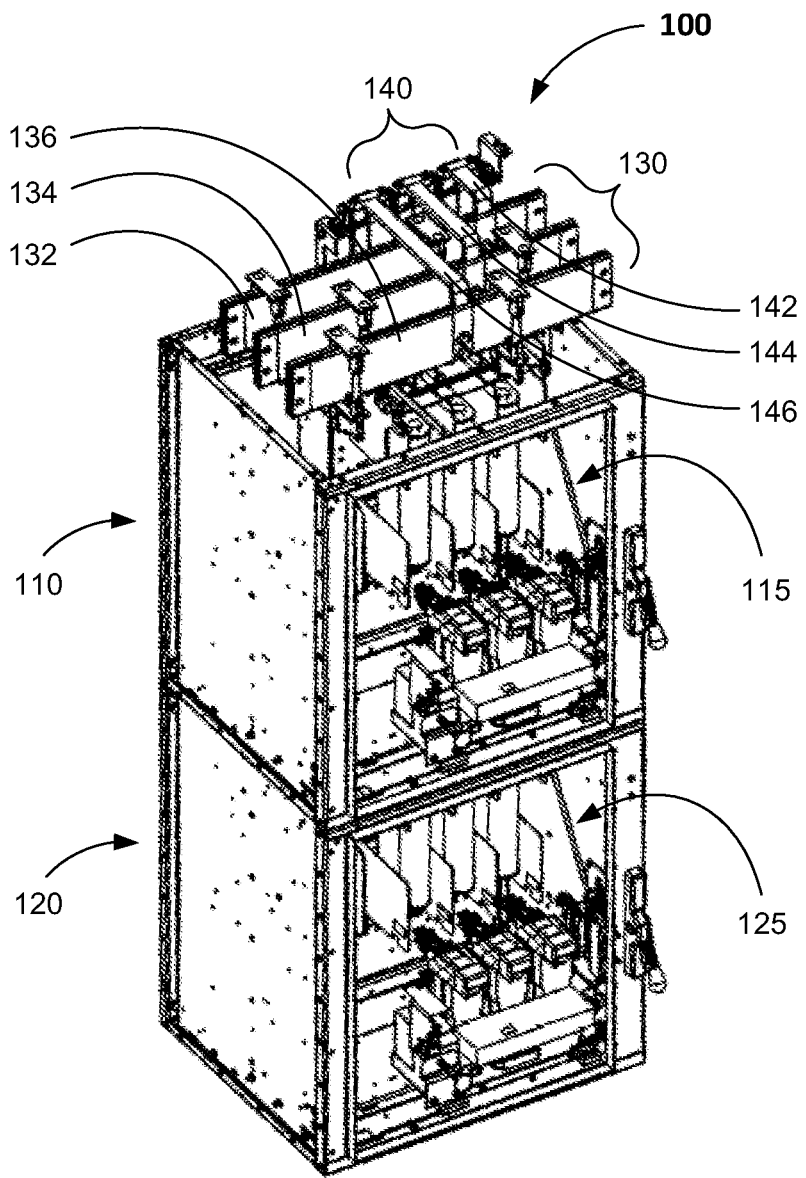
FIG. 1 illustrates a perspective view of a partially-assembled medium-voltage controller enclosure according to embodiments.

FIG. 1 illustrates a medium-voltage controller enclosure 100 in accordance with one or more embodiments. The medium-voltage controller enclosure 100 may be a generally rectangular structure that may be made of sheet metal. In some embodiments, the sheet metal may have a thickness of 11 gauge, and the medium-voltage controller enclosure 100 may be assembled using any suitable technique including, e.g., welding, bolts and nuts, rivets, adhesives, and/or combinations thereof. Other suitable sheet metal gauges, materials, and/or configurations may alternatively be used to construct the medium-voltage controller enclosure 100. In some embodiments, the medium-voltage controller enclosure 100 may be constructed in compliance with one or more NEMA® (National Electrical Manufacturers Association) standards, such as those applicable to, e.g., general purpose, dust tight, outdoor, and/or arc-resistant enclosures. In some embodiments, the medium-voltage controller enclosure 100 may additionally or alternatively comply with other appropriate safety and/or electrical standards, such as those by, e.g., UL (Underwriters Laboratories) and the IEEE (Institute of Electrical and Electronics Engineers). Note that only portions of the medium-voltage controller enclosure 100 are shown in FIG. 1 for illustrative purposes (e.g., front panels/doors are not shown).

Medium-voltage controller enclosure 100 may include an upper cell 110 stacked on top of a lower cell 120. In some embodiments, medium-voltage controller enclosure 100 may include only a single controller cell. Upper cell 110 may include a medium-voltage controller 115, and/or lower cell 120 may include a medium-voltage controller 125. Upper cell 110 and lower cell 120 may be constructed identically, or substantially identically, and may be electrically isolated from each other. That is, power may be connected to both controllers 115 and 125, disconnected from both controllers 115 and 125, or connected to only one of controllers 115 and 125 and disconnected from the other of controllers 115 and 125. Medium-voltage controller 115 and/or 125 may have a voltage rating ranging from, e.g., about 2,300 volts to about 15,000 volts maximum. Additionally or alternatively, medium-voltage controller 115 and/or 125 may be used with medium-voltage controllers rated to about 800 amperes maximum. In some embodiments, other suitable types of voltage controllers, such as, e.g., low-voltage controllers, for use with various types of electrical components, such as, e.g., motors, transformers, capacitors, etc., may be used in cells 110 and 120.

Medium-voltage controller enclosure 100 may also include a main voltage bus 130 and a secondary voltage bus 140. Main voltage bus 130 may extend horizontally across the medium-voltage controller enclosure 100 and may include three main conductors 132, 134, and 136. Each of main conductors 132, 134, and 136 may provide a voltage of a respective phase (e.g., phase A, phase B, or phase C) of a three-phase voltage source. Similarly, secondary bus 140 may include up to three secondary conductors 142, 144, and 146 that may be connected to respective main conductors 132, 134, and 136. In some embodiments, main bus 130 and/or secondary bus 140 may have other suitable numbers of conductors. Secondary bus 140 may extend vertically down along the back side (not shown) of the medium-voltage controller enclosure 100 to provide both upper cell 110 and lower cell 120 with access to power. Main voltage bus 130 and portions of secondary bus 140 may be enclosed in a separate compartment (not shown in FIG. 1 for illustrative purposes) at the top of the medium-voltage controller enclosure 100. In some embodiments, main voltage bus 130 and/or secondary voltage bus 140 may be arranged differently than shown.

Figure 2:
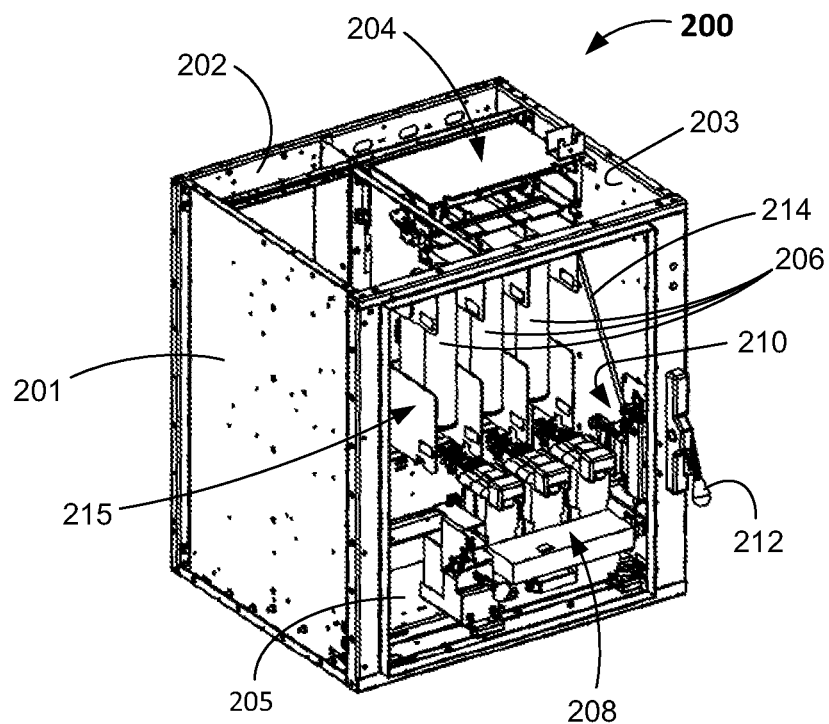
FIG. 2 illustrates a perspective view of a partially-assembled medium-voltage controller cell according to embodiments.

FIG. 2 illustrates a voltage controller cell 200 in accordance with one or more embodiments. Voltage controller cell 200, which may be, e.g., upper cell 110 or lower cell 120, may be a generally rectangular structure suitable for vertical stacking, and may include side walls 201, 202, and 203, floor 205, and a top panel and a front access door (neither shown for illustrative purposes). Voltage controller cell 200 may be made of sheet metal (such as, e.g., 11 gauge sheet metal) and may be assembled using any suitable technique including, e.g., welding, bolts and nuts, rivets adhesives, and/or combinations thereof. Other suitable sheet metal gauges, materials, and/or configurations may alternatively be used to construct voltage controller cell 200.

Voltage controller cell 200 may include a voltage controller 215, which may be, e.g., medium-voltage controller 115 or 125. Voltage controller 215 may include a non-load break isolating switch 204, and may also include fuses 206, a contactor 208, and an operating mechanism 210. Other components (not shown), such as, e.g., current and voltage transformers and various monitoring equipment may also be included in voltage controller 215. The non-load break isolating switch 204 may provide a power connection to a main voltage bus, such as, e.g., main voltage bus 130, via a breakable connection to a secondary voltage bus, such as, e.g., secondary voltage bus 140. The secondary voltage bus may extend, e.g., vertically into voltage controller cell 200. The non-load break isolating switch 204 may be mounted or attached to voltage controller cell 200 in any suitable manner including, e.g., welding, bolts and nuts, rivets, adhesives, combinations thereof, etc. Fuses 206 may be connected between the non-load break isolating switch 204 and contactor 208 to protect against current overload and/or short circuit conditions. Each of fuses 206 may be provided for a respective voltage phase connection, and fuses 206 may be either, e.g., a bolt-in or clip-in type. Contactor 208 may be connected to fuses 206 and may transfer power to one or more voltage terminals (not shown) located in voltage controller cell 200. The voltage terminals may be configured for connection via, e.g., cables to an electric motor or other load circuit. Contactor 208 may be, e.g., a vacuum, air magnetic, or other type contactor having any suitable bolt-in or stab-in type configuration. The operating mechanism 210 may connect an ON/OFF switch handle 212 of the voltage controller cell 200 to a one end of a connector member 214, which may be a rigid rod. The other end of connector member 214 may connect to the non-load break isolating switch 204. Operation of switch handle 212 may cause operating mechanism 210 to drive connector member 214 such that the non-load break isolating switch 204 may make or break a connection with the secondary voltage bus, such as, e.g., secondary voltage bus 140, as described in more detail below in connection with FIGS. 7-10.

Figure 3:
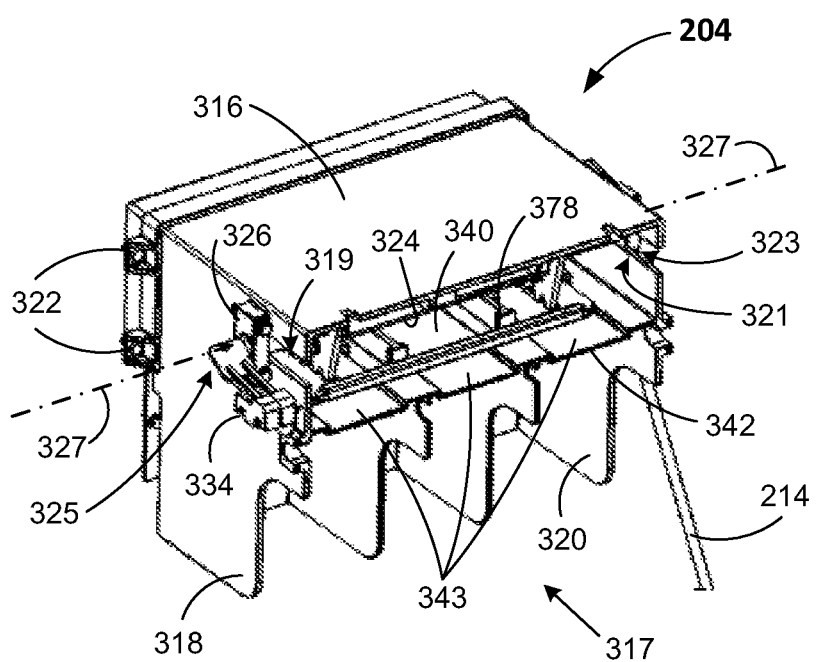
FIG. 3 illustrates a perspective view of a non-load break isolating switch that may be used in a medium-voltage controller cell according to embodiments.

FIG. 3 illustrates the non-load break isolating switch 204 in more detail in accordance with one or more embodiments. The non-load break isolating switch 204 may include a housing 316 which may have an open front face 317 and may have side walls 318 and 320. Side walls 318 and 320 may have respective oppositely-located slots 319 and 321 extending inward from the open front face 317. Housing 316 may be attached to a voltage controller cell in any suitable manner including, e.g., threading a pair of bolts located on each side of housing 316, such as, e.g., bolts 322 (of which only one pair is shown in FIG. 3), to a frame, bracket, or other structural member of the voltage controller cell. Housing 316 may be constructed as a single integrated part or from multiple parts using any suitable plastics and/or non-conductive materials.

In some embodiments, the non-load break isolating switch 204 may include a connector member 214, only a portion of which is shown in FIG. 3. Connector member 214 may be, e.g., a rigid rod. In other embodiments, the non-load break isolating switch 204 may not include connector member 214, which instead may be a part of the voltage controller cell. Other types of connector members may be used, such as sheathed cables. One end of connector member 214 may be pivotally attached (not shown) to a gear shaft 324 of the non-load break isolating switch 204 at a shaft end 323. Opposite shaft ends 323 and 325 of gear shaft 324 may be positioned and secured in respective slots 319 and 321 with hardware 326 affixed to side was 318 and 320 such that gear shaft 324 may rotate clockwise and counterclockwise about its longitudinal axis 327. Alternatively, gear shaft 324 may be secured in housing 316 in any suitable manner that allows gear shaft 324 to rotate clockwise and counterclockwise about its longitudinal axis 327.

Figure 4:
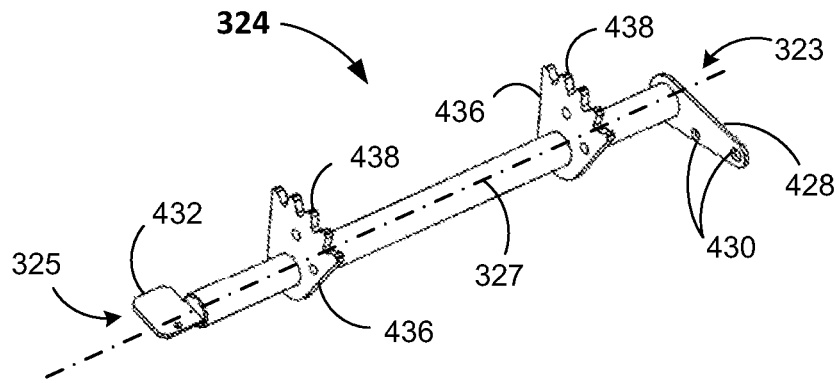
FIG. 4 illustrates a perspective view of a gear shaft that may be used in a non-load break isolating switch according to embodiments.

FIG. 4 illustrates gear shaft 324 in more detail in accordance with one or more embodiments Gear shaft 324 may have a lever 428 at shaft end 323. Lever 428 may be configured to pivotally attach to a connector member, such as, e.g., connector member 214, via, e.g., one of connecting holes 430 such that reciprocating movement of the connector member may cause gear shaft 324 to rotate clockwise and counterclockwise about its longitudinal axis 327. In other embodiments, lever 428 may be located anywhere along a length of the gear shaft 324. Gear shaft 324 may also include a tab-like structure 432 at opposite shaft end 325. Tab-like structure 432 may be used to operate a limit switch 334 (see FIG. 3) that may indicate when the non-load break isolating switch 204 has opened the connection with the secondary voltage bus 140 and/or, alternatively, has closed the connection with the secondary voltage bus 140. Gear shaft 324 may further include a pair of mangle gears 436. As shown, mangle gears 434 have teeth 438 that extend less than 360 degrees (e.g., about 60 degrees as shown) about the circumference of gear shaft 324. Teeth 438 may be configured as spur teeth and, alternatively, may be in any other suitable form. In alternative embodiments, gear shaft 324 may have only one mangle gear 436 or more than two mangle gears 436. Any suitable number of mangle gears 436 may be used. In some embodiments, one or more mangle gears 436 may be replaced with a full spur gear (i.e., a gear having spur teeth that extend completely around the circumference of gear shaft 324). Gear shaft 324 may be constructed using any suitable metallic and/or non-metallic materials, and may be constructed from a single piece of suitable material or from two or more parts of suitable material(s).

Returning to FIG. 3, the non-load break isolating switch 204 may also include a slider 340 and a support member 342. Support member 342 may be a shelf or platform-like structure that may be an integrally-formed part of housing 316. Alternatively, support member 342 may be a separate part attached to housing 316 in any suitable manner. For example, support member 342 may be attached to side was 318 and 320 using any suitable adhesive, fastener arrangement (e.g., screws, bolts, brackets, etc.), and/or tongue and groove type arrangement (where, e.g., grooves (not shown) in side walls 318 and 320 are configured to receive a respective tongue (not shown) extending along the side edges of support member 342). Support member 342 may include one OF more slots 343 (three are shown in FIG. 3) configured to receive and allow slider 340 to slide linearly back and forth therein, as described in more detail below in connection with FIGS. 7-10, In some embodiments, one or more of the surfaces of slider 340 and slots 343 that are in contact with each other may be coated with a suitable electrically-safe lubricant to reduce the sliding friction there between. Slider 340 and support member 342 may be constructed using any suitable plastic(s) and/or other non-conductive material(s) having low friction qualities.

Figure 5:
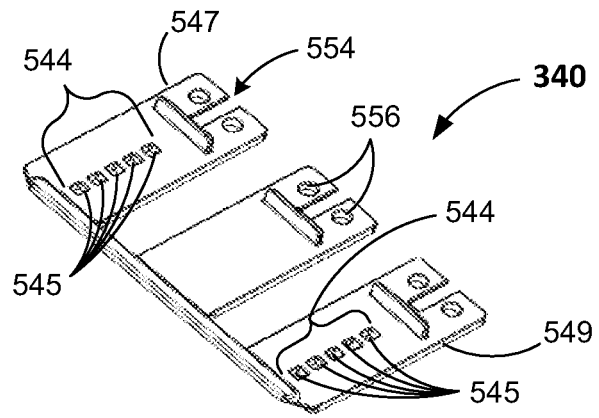
FIGS. 5 and 6 illustrate perspective views of a slider that may be used in a non-load break isolating switch according to embodiments.
Figure 6:
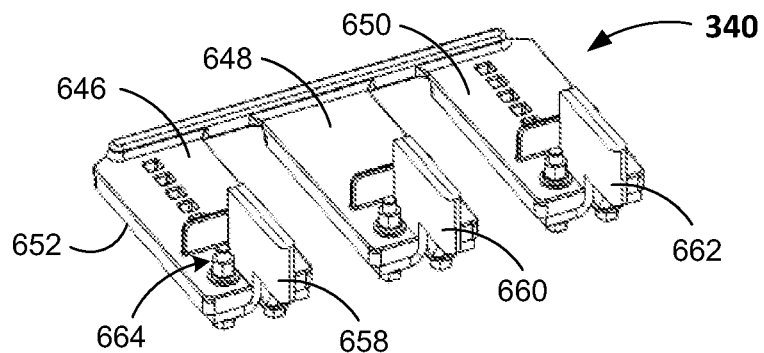

FIGS. 5 and 6 illustrate slider 340 in more detail in accordance with one or more embodiments. Slider 340 may include a pair of gear racks 544 that may correspond to (i.e., mesh with) mangle gears 436 of gear shaft 324. That is, each gear rack 544 may include a plurality of gear teeth holes 545 that are configured to receive and correspond in size, depth, shape, and spacing to teeth 438. In some embodiments, gear racks 544 and/or gear teeth holes 545 may be of other suitable configurations corresponding to other suitable configurations of gears 436 and/or teeth 438. In some embodiments, slider 340 may include more or less gear racks 544, and/or more or less gear teeth holes 545 that those shown, provided that when meshed with gears 436 and teeth 438 they impart the necessary linear movement of slider 340 as described below in connection with FIGS. 7-10.

Slider 340 may include three slider sections 646, 648, and 650, each of which is configured to slide in a respective slot of a support member, such as, e.g., slots 343 of support member 342. The bottom surfaces 652 of slider sections 646, 648, and 650, which may contact the surfaces of slots 343, may optionally be coated with a suitable electrically-safe lubricant to reduce any sliding friction that may occur when slider 340 slides in slots 343 of support member 342. Note that in some alternative embodiments, the non-load break isolating switch 204 may not include support member 342. Instead, slider 340 may be slidingly received in housing 316 via, e.g., grooves or ledges (not shown) formed in or on the inside of side walls 318 and 320 of housing 316. The grooves or ledges may be configured to slidingly receive respective outside edges 547 and 549 of slider 340. Optionally, a suitable electrically-safe lubricant may be applied to the grooves or ledges and/or outside edges 547 and 549 to reduce any sliding friction there between. In other alternative embodiments not having a support member 342, slider 340 may be slidingly received in housing 316 in any other suitable manner.

Each of slider sections 646, 648, and 650 may have a slot 554 and a pair of bolt holes 556 configured to receive a conductive connector, such as, e.g., conductive connectors 658, 660, and 662, shown in FIG. 6. Conductive connectors 658, 660, and 662 may be generally T-shaped and positioned in slots 554 such that nuts and bolts 664 may be used to attach conductive connectors 658, 660, and 662 to slider 340. Conductive connectors 658, 660, and 662 may be made of copper or other suitable conductive material(s). Conductive connectors 658, 660, and 662 may, in some embodiments, be stabs, which are conductive blade-like structures. Fuses 206 of voltage controller cell 200 may be electrically connected to conductive connectors 658, 660, and 662 via, e.g., an electrical connection to nuts and bolts 664. The number of slider sections may correspond to the number of voltage phases provided by the secondary voltage bus, such as, e.g., the three voltage phases provided by secondary voltage bus 140. Accordingly, in some embodiments, the number of slider sections may be different than the three slider sections 646, 648, and 650 shown in FIGS. 5 and 6. Slider 340 may be constructed from a single piece of plastic or other non-conductive material or, alternatively, may be constructed and assembled from two or more parts of suitable material(s).

Gear shaft 324 and slider 340 may form a rack and pinion type mechanism that converts rotational motion of gear shaft 324 to linear motion of slider 340, as now described in connection with FIGS. 7-10.

Figure 7:
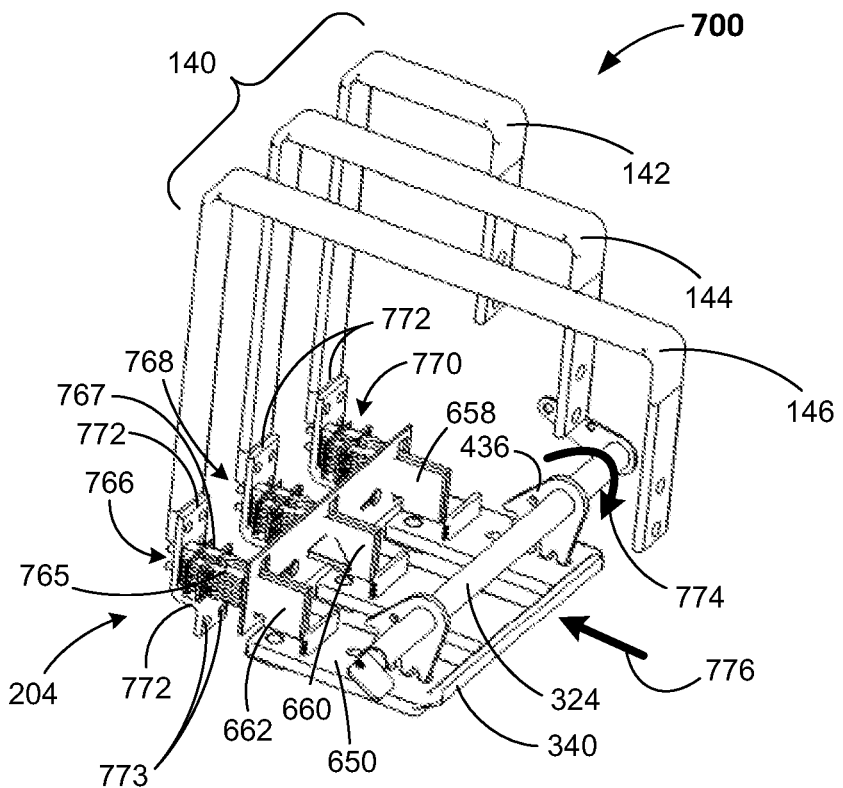
FIGS. 7 and 8 illustrate perspective and top views, respectively, of a partially assembled non-load break isolating switch in an engaged position with a voltage bus according to embodiments.
Figure 8:
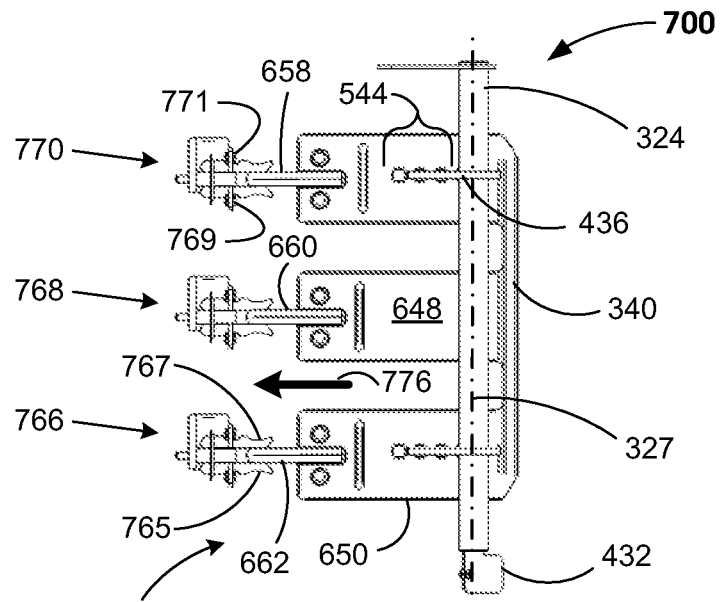

FIGS. 7 and 8 illustrate (the relevant parts of) the non-load break isolating switch 204 in an engaged position 700 with the secondary voltage bus 140. In the engaged position 700, voltage may be provided from main bus 130 (of FIG. 1) to contactor 208 (of FIG. 2) via a continuous electrical path through secondary voltage bus 140, non-load break isolating switch 204, and fuses 206. The non-load break isolating switch 204 may have finger assemblies 766, 768, and 770 that may be configured to electrically connect to respective secondary voltage conductors 146, 144, and 142 of secondary voltage bus 140 via respective connective brackets 772. A pair of lower bolt holes 773 in brackets 772 may be used with bolts and nuts to attach finger assemblies 766, 768, and 770 to housing 316 (not shown in FIGS. 7 and 8). Other suitable techniques may be used to attach finger assemblies 766, 768, and 770 to housing 316. Finger assemblies 766, 768, and 770 may each include a plurality of stacked finger pairs 765 and 767 that may be made of a suitable metal or other conductive material(s). Finger pairs 765 and 767 may be laterally compressed towards each other by, e.g., springs 769 and 771 (i.e., finger pairs 765 and 767 may be spring loaded). Alternatively, finger pairs 765 and 767 may be laterally compressed towards each other in any other suitable manner. In some embodiments, each finger assembly may have four vertically stacked finger pairs 765 and 767. Finger assemblies may have any number of vertically stacked finger pairs required to appropriately conduct power.

Engaged position 700 may occur when (referring back to FIG. 2) ON/OFF switch handle 212 is moved through a 180 degree arc from an OFF position to an ON position. In response to this movement of switch handle 212, operating mechanism 210 may cause connector member 214, which may be attached to gear shaft 324 at lever 428, to move such that gear shaft 324 rotates clockwise (referring now to FIGS. 7 and 8), as indicated by arrow 774. As gear shaft 324 rotates clockwise, teeth 438 of mangle gears 436 may engage (i.e., mesh with) corresponding and aligned gear teeth holes 545 of gear racks 544 to linearly move slider 340 towards finger assemblies 766, 768, and 770, as indicated by arrow 776. Slider 340 may continue to move towards finger assemblies 766, 768, and 770 until conductive connectors 658, 660, and 662 force apart respective finger pairs 765 and 767 and are fully received in and electrically engaged with respective finger assemblies 766, 768, and 770. Operating mechanism 210, connector member 214, gear shaft 324, slider 340 may be configured such that movement of the ON/OFF switch handle 212 from the OFF position to the ON position results in only the necessary linear movement of slider 340 required to establish an electrical connection with the secondary voltage bus. Additionally or alternatively, housing 316 of the non-load break isolating switch 204 may include one or more stops 378 (see FIG. 3) to prevent slider 340 from linearly translating more than is needed for conductive connectors 658, 660, and 662 to be fully received in and electrically engaged with finger assemblies 766, 768, and 770.

Figure 9:
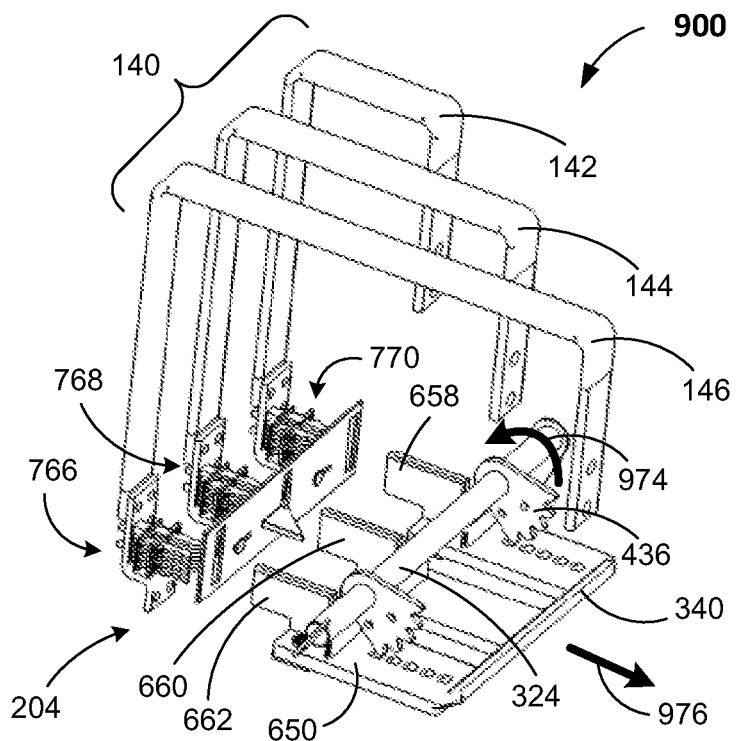
FIGS. 9 and 10 illustrate perspective and top views, respectively, of a partially assembled non-load break isolating switch in a disengaged position with a voltage bus according to embodiments.
Figure 10:
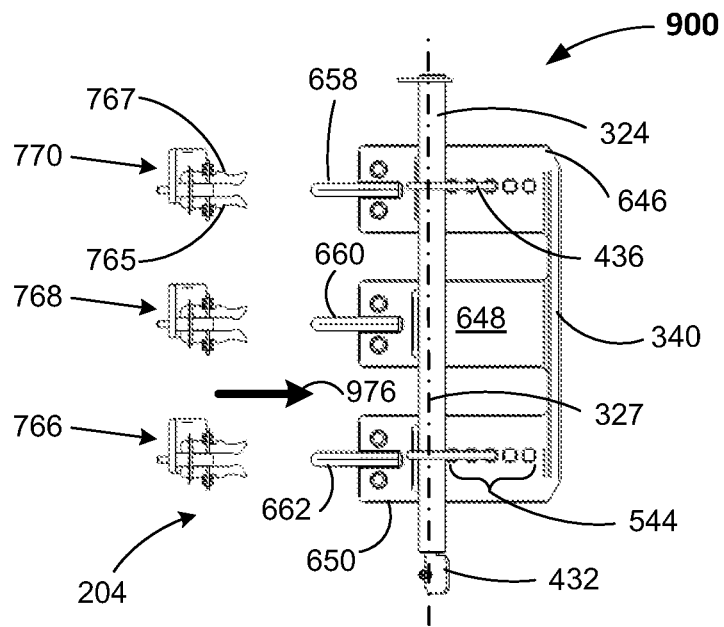

FIGS. 9 and 10 illustrate (the relevant parts of) the non-load break isolating switch 204 in a disengaged position 900 with the secondary voltage bus 140. In the disengaged position 900, the voltage path between main bus 130 and contactor 208 is opened (i.e., disconnected) at the non-load break isolating switch 204. Disengaged position 900 may occur when (referring back to FIG. 2) ON/OFF switch handle 212 is moved through a 180 degree arc from an ON position to an OFF position. In response to this movement of switch handle 212, operating mechanism 210 may cause connector member 214, which may be attached to gear shaft 324 at lever 428, to move such that gear shaft 324 rotates counterclockwise (referring now to FIGS. 9 and 10), as indicated by arrow 974. As gear shaft 324 rotates counterclockwise, teeth 438 of mangle gears 436 may engage (i.e., mesh with) corresponding and aligned gear teeth holes 545 of gear racks 544 to linearly move slider 340 away from finger assemblies 766, 768, and 770, as indicated by arrow 976. Slider 340 may continue to move away from finger assemblies 766, 768, and 770 until conductive connectors 658, 660, and 662 are withdrawn from respective finger pairs 765 and 767 and are electrically disengaged from respective finger assemblies 766, 768, and 770. Operating mechanism 210, connector member 214, gear shaft 324, slider 340 may be configured such that movement of the ON/OFF switch handle 212 from the ON position to the OFF position results in only the necessary linear movement of slider 340 required to break the electrical connection with the secondary voltage bus and maintain a safe distance from the secondary voltage bus such that electrical arcing may not be possible. Additionally or alternatively, housing 316 of the non-load break isolating switch 204 may include one or more stops (not shown) to prevent slider 340 from linearly translating more than a safe distance away from conductive connectors 658, 660, and 662 in the disengaged position 900.

In some alternative embodiments, gear shaft 324 may be oriented to rotate about a longitudinal axis other than the horizontal longitudinal axis shown, and/or slider 340 may be oriented to linearly move in a direction other than the horizontal direction shown. Corresponding changes in the configuration of the secondary voltage bus 140, operating mechanism 210, connecting member 214, and/or various parts of gear shaft 324 and slider 340 may accordingly also need to be made.

In some alternative embodiments, slider 340 may be configured as a hinged member. The hinged member may have, e.g., one end attached to, e.g., side walls 318 and 320 of housing 316 such that rotation of gear shaft 324 may cause the hinged member to move or pivot in an arc, wherein conductive connectors of the hinged member engage and disengage finger assemblies 766, 768, and 770. Various changes in the configuration of operating mechanism 210, connecting member 214, and/or various parts of gear shaft 324 may accordingly also need to be made.

Figure 11:
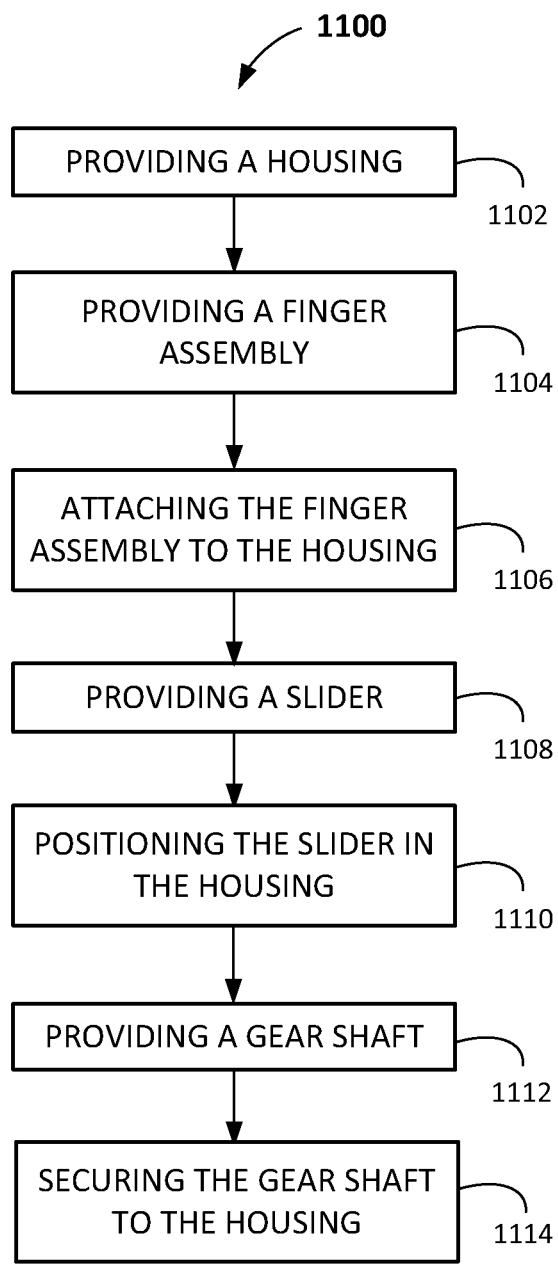
FIG. 11 illustrates a method of assembling a non-load break isolating switch according to embodiments.

FIG. 11 illustrates a method of assembling a non-load break isolating switch, such as, e.g., non-load break isolating switch 204, in accordance with one or more embodiments. Method 1100 may include at process block 1102 providing a non-load break isolating switch housing, such as, e.g., housing 316 of non-load break isolating switch 204. The non-load break isolating switch housing may have an open front face and side walls having oppositely-located slots extending inward from the open front face, such as, e.g., open front face 317, side walls 318 and 320, and oppositely-located slots 319 and 321 of housing 316. The non-load break isolating switch housing may be constructed as a single integrated part or from multiple parts using any suitable plastics and/or other suitable non-conductive materials.

At process block 1104, method 1100 may include providing a finger assembly, such as, e.g., any one of finger assemblies 766, 768, of 770 of non-load break isolating switch 204. The finger assembly may include a plurality of stacked finger pairs, such as, e.g., finger pairs 765 and 767, that may be made of a suitable metal or other suitable conductive material. The finger pairs may be spring loaded such that each finger of the finger pair is laterally compressed towards the other finger by, e.g., springs, such as, e.g., springs 769 and 771. Alternatively, each finger of a finger pair may be laterally compressed towards the other finger in any other suitable manner. The finger assembly may also include a connective bracket, such as, e.g., bracket 772, for connecting the finger assembly to a secondary voltage bus and/or for attaching the finger assembly to a non-load break isolating switch housing.

At process block 1106, the finger assembly may be attached to the non-load break isolating switch housing. In some embodiments, the finger assembly may be attached to the housing of the non-load break isolating switch using the connective bracket and nuts and bolts. Alternatively, other suitable mounting and attaching techniques may be used to attach the finger assembly to the housing.

At process block 1108, method 1100 may include providing a slider, such as, e.g., slider 340 of non-load break isolating switch 204. The slider may include one or more gear racks that include a plurality of gear teeth holes, such as, e.g., gear racks 544 and gear teeth holes 545, formed on one or more respective slider sections, such as, e.g., slider sections 646, 648, and/or 650. The slider may also include one or more conductive connectors, such as, e.g., conductive connectors 658, 660, and/or 662, attached to respective slider sections. The slider may be constructed from a single piece of suitable plastic or other non-conductive material or, alternatively, may be constructed and assembled from two or more parts of suitable material(s).

At process block 1110, the slider may be positioned in the non-load break isolating switch housing. In some embodiments, the slider may be positioned on a support member, such as, e.g., support member 342 of housing 316, such that the slider sections are seated in corresponding slots of the support member, such as, e.g., slots 343 of support member 342. Positioning the slider on the support member may optionally involve applying a suitable electrically-safe lubricant to any of the surfaces of the support member slots and the slider sections that are in contact with each other to reduce any sliding friction that may occur there between. In those alternative embodiments not having a support member, the slider may be slidingly positioned in the non-load break isolating switch housing in any suitable manner, including, e.g., by inserting the outside edges of the slider in or on corresponding grooves or ledges formed in or on the inside side walls of the housing. Optionally, a suitable electrically-safe lubricant may be applied to the grooves or ledges and/or to the outside edges of the slider to reduce any sliding friction there between.

At process block 1112, method 1100 may include providing a gear shaft, such as, e.g., gear shaft 324 of non-load break isolating switch 204. The gear shaft may have a lever at one end of the gear shaft, such as, e.g., lever 428 at shaft end 323, configured to pivotally attach to a connector member, such as, e.g., connector member 214, such that reciprocating movement of the connector member may cause the gear shaft to rotate clockwise and counterclockwise about the gear shaft's longitudinal axis, such as longitudinal axis 327. The gear shaft may also include a tab-like structure at an opposite end of the gear shaft, such as, e.g., tab-like structure 432 at opposite shaft end 325. The tab-like structure may be used to operate a limit switch, such as limit switch 334 of non-load break isolating switch 204. The gear shaft may also include one or more gears each having gear teeth, such as, e.g., mangle gears 436 and teeth 438. The teeth may be configured as spur teeth or, alternatively, may be in any other suitable form. In some embodiments, the one or more gears may be full spur gears. The gear shaft may be constructed using any suitable metallic and/or non-metallic materials, and may be constructed from a single piece of suitable material or from two or more parts of suitable material(s).

At process block 1114, the gear shaft may be secured to the housing of the non-load break isolating switch in any suitable manner such that (1) the gear shaft is allowed to rotate about its longitudinal axis in both a clockwise and counterclockwise direction in response to a reciprocating motion of a connector member connected to the gear shaft, and (2) the one or more gears of the gear shaft are respectively aligned with and configured to engage (i.e., mesh with) the one or more gear racks of the slider such that rotation of the gear shaft causes linear motion of the slider. That is, a clockwise rotation of the gear shaft causes linear motion of the slider in one direction for a required distance, and a counterclockwise rotation of the gear shaft causes linear motion of the slider in an opposite direction for a required distance.

The above process blocks of method 1100 may be executed or performed in an order or sequence not limited to the order and sequence shown and described. For example, in some embodiments, the pair of process blocks 1108 and 1110 may be performed in reverse order with the pair of process blocks 1112 and 1114. Also, some of the process blocks of method 1100 may be executed or performed substantially simultaneously or in parallel where appropriate or desired. For example, any two or more of process blocks 1102, 1104, 1108, and/or 1112 may be performed substantially simultaneously or in parallel.

Persons skilled in the art should readily appreciate that the invention described herein is susceptible of broad utility and application. Many embodiments and adaptations of the invention other than those described herein, as well as many variations, modifications, and equivalent arrangements, will be apparent from, or reasonably suggested by, the invention and the foregoing description thereof, without departing from the substance or scope of the invention. For example, although described in connection with medium-voltage controllers, one or more embodiments of the invention may be used with other types of voltage controllers, including high-voltage and low-voltage controllers. Accordingly, while the invention has been described herein in detail in relation to specific embodiments, it should be understood that this disclosure is only illustrative and presents examples of the invention and is made merely for purposes of providing a full and enabling disclosure of the invention. This disclosure is not intended to limit the invention to the particular apparatus, devices, assemblies, systems or methods disclosed, but, to the contrary, the intention is to cover all modifications, equivalents, and alternatives falling within the scope of the invention.

What is claimed is:

1. A non-load break isolating switch, comprising:
a finger assembly configured to electrically connect to a voltage bus;
a slider comprising a gear rack and a conductive connector configured to electrically engage and disengage the finger assembly;
a gear shaft comprising a longitudinal axis and a gear configured to mesh with the gear rack; and
a housing within which the slider, gear shaft, and finger assembly are located; wherein:
rotation of the gear shaft about the longitudinal axis causes the slider to:
move linearly from a first position at which the conductive connector electrically engages the finger assembly to a second position at which the conductive connector is electrically disengaged from the finger assembly, or
move linearly from the second position to the first position.

2. The non-load break isolating switch of claim 1 wherein the housing comprises a support member having a slot, the slot configured to receive and provide a fixed path for the slider to move linearly from the first position to the second position or from the second position to the first position.

3. The non-load break isolating switch of claim 1, further comprising a connector member attached to the gear shaft and configured to be driven by an operating mechanism of a voltage controller cell.

4. The non-load break isolating switch of claim 1 wherein the gear of the gear shaft comprises a mangle pinion gear having a plurality of spur teeth.

5. The non-load break isolating switch of claim 1 wherein the conductive connector comprises a stab.

6. The non-load break isolating switch of claim 1 wherein the slider comprises first, second, and third sections, the first section comprising the conductive connector, the second section comprising a second conductive connector, and the third section comprising a third conductive connector.

7. The non-load break isolating switch of claim 1 wherein the slider comprises first and second sections, the first section comprising the gear rack and the second section comprising a second gear rack.

8. The non-load break isolating switch of claim 1 wherein the gear shaft comprises a second gear.

9. The non-load break isolating switch of claim 1 wherein clockwise rotation of the gear shaft about the longitudinal axis causes the slider to move linearly toward the finger assembly from the second position to the first position.

10. The non-load break isolating switch of claim 1 wherein counterclockwise rotation of the gear shaft about the longitudinal axis causes the slider to move linearly away from the finger assembly from the first position to the second position.

11. A method of assembling a non-load break isolating switch, the method comprising:
providing a housing;
providing a finger assembly configured to electrically connect to a voltage bus;
attaching the finger assembly to the housing;
providing a slider having a gear rack and a conductive connector configured to electrically engage and disengage the finger assembly;
positioning the slider in the housing;
providing a gear shaft having a longitudinal axis and a gear that meshes with the gear rack; and
securing the gear shaft to the housing such that the gear shaft is operative to rotate about the longitudinal axis to cause the slider to:
linearly translate from a first position at which the conductive connector electrically engages the finger assembly to a second position at which the conductive connector is electrically disengaged from the finger assembly, or
linearly translate from the second position to the first position.

12. The method of claim 11 wherein providing a finger assembly comprises providing a finger assembly having a plurality of stacked, spring-loaded finger pairs configured to receive the conductive connector there between.

13. The method of claim 11 wherein providing a slider comprises:
providing a slider having a gear rack, a slot, and a pair of bolt holes; and
attaching a conductive member to the slider by inserting the conductive member in the slot and fastening the conductive member to the slider by inserting respective bolts through the pair of bolt holes and securing the bolts with nuts.

14. The method of claim 11 wherein positioning the slider in the housing comprises positioning the slider on a support member of the housing, the support member having a slot configured to receive a section of the slider.

15. The method of claim 11 wherein providing a gear shaft comprises providing a gear shaft further having a lever at one end of the gear shaft configured to attach to a connector member of a voltage controller cell.

16. The method of claim 11 wherein securing the gear shaft to the housing comprises securing the gear shaft to the housing such that the gear of the gear shaft is positioned to engage the gear rack of the slider and cause the slider to linearly translate in response to rotation of the gear shaft.

17. A method of using a non-load break isolating switch, the method comprising:
connecting power to a non-load break isolating switch;
moving a switch handle operatively connected to the non-load break isolating switch from an OFF position to an ON position to cause the non-load break isolating switch to close an electrical connection within the non-load break isolating switch to the power by causing a gear shaft to rotate in a first rotational direction, the gear shaft rotating in the first rotational direction causing a slider comprising a conductive connector to move linearly in a first direction to electrically connect with the power; and
moving the switch handle from the ON position to the OFF position to cause the non-load break isolating switch to open the electrical connection to the power by causing the gear shaft to rotate in a second rotational direction, the gear shaft rotating in the second rotational direction causing the slider comprising the conductive connector to move linearly in a second direction to electrically disconnect from the power.

* * * * *